Jan. 1, 1946.   F. A. SHERMAN   2,392,004
HYDRAULIC CRANE
Filed Sept. 30, 1943   2 Sheets-Sheet 2
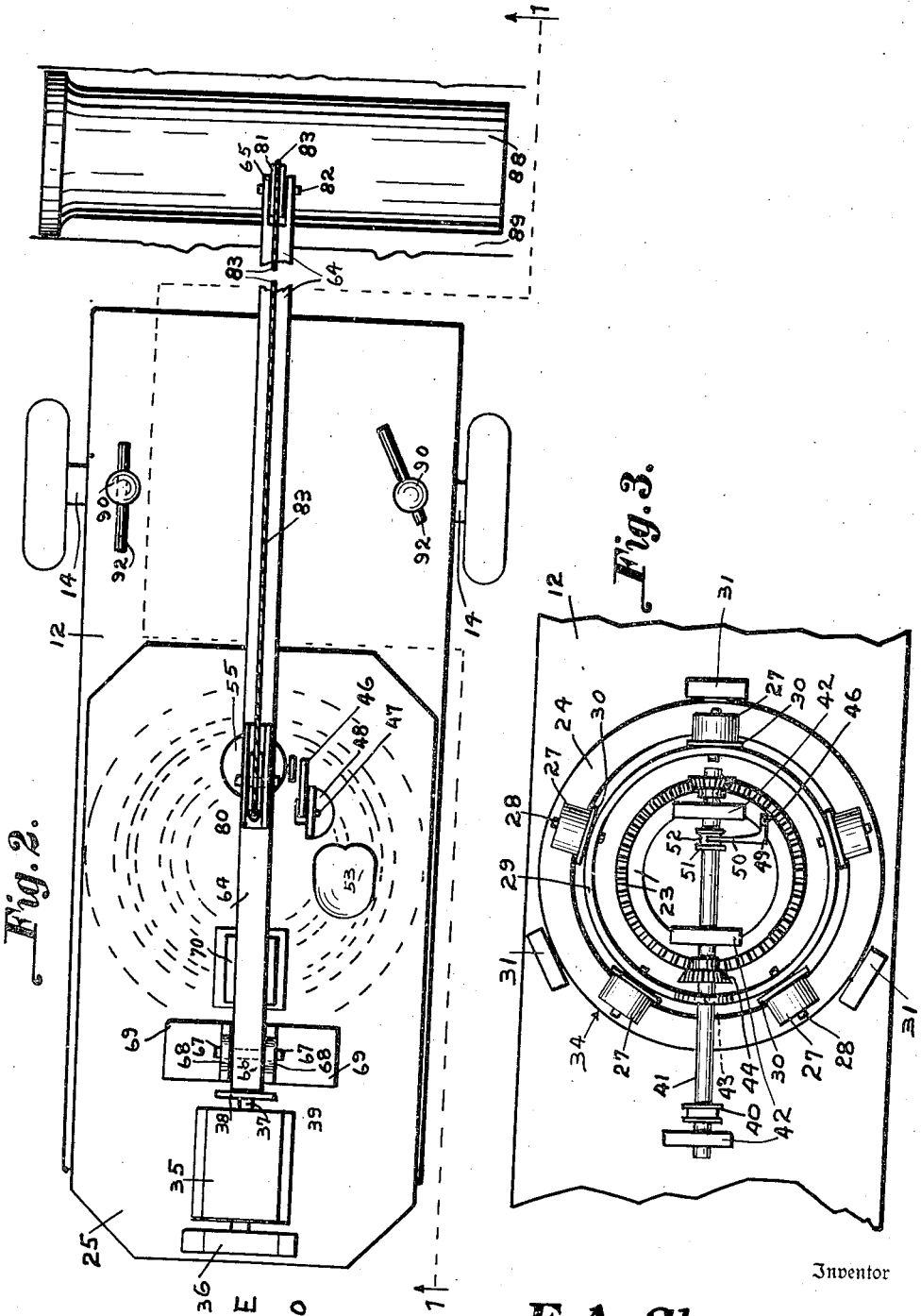
Inventor
By F. A. Sherman,
*Arthur H. Sturges.*
Attorney Patented Jan. 1, 1946

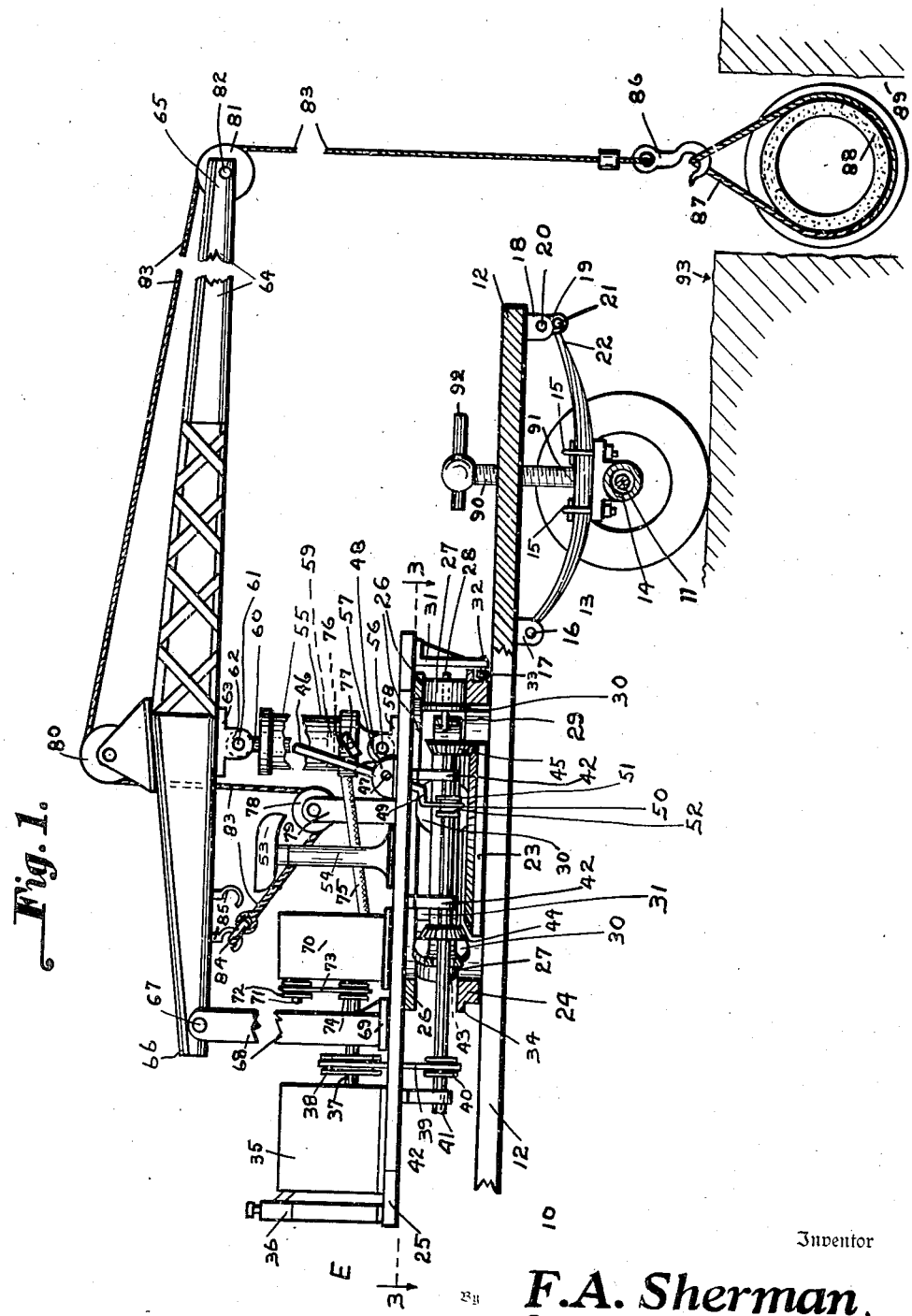

2,392,004

UNITED STATES PATENT OFFICE 2,392,004

HYDRAULIC CRANE

Fred A. Sherman, Juniata, Nebr., assignor to Oscar Neander, Grand Island, Nebr.

Application September 30, 1943, Serial No. 504,370

8 Claims. (Cl. 212—34)

This invention relates to cranes and more particularly to portable cranes.

It is an object of the invention to provide a combination of instrumentalities so constructed and assembled in a derrick crane that heavy articles may be readily transported, raised, lowered and swung horizontally.

Another object of the invention is to provide a device for the above stated purposes the wheeled vehicle of which is provided with springs between the body of said vehicle and said wheels for absorbing shocks and jars incident to road travelling movements of the vehicle; and to also provide means for relieving the compressive weight from said springs caused by massive articles during a swinging, raising and lowering of said articles by the device of the present invention.

Other and further objects and advantages of the invention will be understood from the following detailed description thereof.

In the drawings:

Figure 1 is a side elevation of the rear end portion of the present invention, certain parts thereof being shown partially broken away and others showing in vertical section, the view being taken substantially on line 1—1 of Figure 2.

Figure 2 is a top plan view of the parts shown in Figure 1, a sling for a conduit being omitted.

Figure 3 is a top plan view taken substantially on line 3—3 of Figure 1 and depicting certain parts of a turn table mechanism employed.

Referring now to the drawings, 10 indicates generally a self-propelled truck having at the forward end thereof an internal combustion engine generally indicated at E. The engine and certain other parts of the truck are not shown, since the same are of conventional construction. The truck may be provided with one or more driving axles for rotating the traction wheels thereof, together with a propeller shaft extending from said engine through conventional transmission gearing to said axles, and, if desired, the propeller shaft may extend to the rear axle 11, the latter being provided with a conventional differential gear, not shown, whereby the truck 10 is self-propelled forwardly or backwardly in a well known manner.

Also, if desired, the herein specifically described parts may be utilized in conjunction with a detachable tractor or self-propelled towing device.

The device of the present invention includes an elongated body 12 having at the rear end thereof a pair of oppositely disposed rear springs 13 which are secured to the rear axle housing 14 by means of shackles 15. The forward ends of the springs are secured to the body 12 by means of pivot pins 16, the latter being carried between ears 17, said ears being secured to the body 12 by any suitable means. At the rear end of the body 12 similar ears 18 are provided to which links 19 are pivotally connected as at 20. The lower ends of the links 19 are provided with pivot pins 21 for pivotally securing between the links 19 the rear ends 22 of the springs 13.

The body 12 at the rear end thereof is preferably flat, as shown in Figure 1, and adjacent the rear end of the body 12 of the device an annular toothed pinion 23 is secured stationary to the upper surface of the body 12 by any suitable means, such as bolts, welding or the like. A flanged hold-down ring 24 is similarly suitably secured to said upper surface, said ring being disposed axially with respect to the stationary pinion 23, as best shown in Figure 3.

Above the body 12 a revoluble platform 25 is provided. On the lower surface of the platform 25 an annular bearing ring or second circular track 26 is suitably secured thereto, said ring being of approximately the same diameter as the hold-down ring 24, being also axially disposed with respect to the center of the stationary toothed pinion 23.

Between the upper surface of the hold-down ring 24 and the lower surface of the bearing ring 26 a plurality of anti-friction rollers 27 is provided, as best shown in Figure 3.

The rollers are pivotally mounted on their stub axles 28, said axles being secured to an annular holder 29 for maintaining the axles 28 equidistantly spaced apart. The rollers 27 are provided with flanges 30 disposed between their inner vertical surfaces and the axle holder 29, and as thus described it will be understood that at times when the platform 25 is carried by the rollers, as shown in Figure 1, during revoluble movements of said platform the flanges 30 bear against the inner annular edges of the members 24 and 26 to maintain and guide the platform in a fixed circular orbit, the axis thereof being the center of the large stationary pinion 23, whereby sliding movements of the platform with respect to the body 12 are prevented.

Since at times heavy weights are supported by the platform 25 and at a remote distance with respect to the latter, means are provided for holding the platform 25 substantially in parallelism with the body 12 of the truck at all times, while at the same time permitting revoluble movements of the platform with respect to the truck, said means comprising a plurality of brackets 31 having upper ends rigidly secured, by welding or the like, to the platform 25. The vertically disposed arms of the brackets are provided with stub axles 32 at the lower ends thereof, upon which are pivotally mounted small antifriction rollers 33. The rollers 33 bear against the underneath surface of the annular flange 34 of the hold-down ring 24 for said purpose and are preferably employed. Also, if desired, but one bracket 31 may be employed.

At one end of the platform 25 an internal combustion engine 35 is secured thereto by any suitable means, said engine being provided with a radiator.

To the rear end of the crank shaft of the engine a shaft 37 is secured. A pulley wheel 38 is secured to the shaft 37 by any suitable means for driving a belt 39, said belt driving a pulley 40, the latter being secured to a slidable shaft 41.

The shaft 41 is journalled through a plurality of shaft hangers 42, the latter being secured by any suitable means to the underneath surface of the revoluble platform 25.

The slidable shaft 41 extends through the annular stub axle holder 29, as at 43, and said annular holder is provided with an expanded yoke portion which surrounds said shaft, as best shown in Figure 1.

Spaced apart pinions 44 and 45 are rigidly secured to the shaft 41. The pinions may have bushings as shown in Figure 3, or said bushings may be omitted as shown in Figure 1. The pinions 44 and 45 are spaced apart a distance such that the teeth of either one may be selectively meshed with the teeth of the stationary pinion 23 by causing the shaft 41 to slide longitudinally through its hangers 42 for said purpose.

A hand lever 46 extends through the platform 25, being pivotally mounted as at 47 to a guide sector or the like 48. The member 48 is suitably secured to the upper surface of the platform 25, as shown in Figures 1 and 2. The lower end of the lever is provided with an arm 49, the latter being provided with a bifurcated yoke 50, the fingers of which, as best shown in Figure 3, are disposed between the annular flanges 51 of a spool 52. The spool is axially secured to the shaft 41, and as thus described it will be noted that at times when the lever 46 is in the position shown in Figure 1, the pinion 45 is then in mesh with the stationary pinion 30 for causing the platform 25 to be revolved in a corresponding direction at times when the engine 35 is operating. At times when the upper end of the lever 46 is moved slightly towards the operator's seat 53, the pinion 45 becomes released from the stationary pinion 23, whereupon no revoluble movement is provided the platform 25 by said engine, and it will be noted that at times when the upper end of the lever is sufficiently disposed towards the driver's seat 53, the other small pinion 44 thereby becomes meshed with the stationary pinion 23, the pinion 45 thereby becoming released, for causing the platform 25 to become rotated correspondingly. At times when the lever 46 is intermediate said positions neither pinion 45 or 44 is in mesh with the stationary pinion 23.

The operator's seat 53 is preferably pivotally mounted upon a supporting post 54, the latter being stationary and secured to the upper surface of the platform 25, whereby at times when revoluble movements in a horizontal direction are imparted to the platform 25 the operator turns therewith.

To one side of the seat 53 the cylinder 55 of a hydraulic jack apparatus is disposed. The lower end of the cylinder is provided with a tongue which is pivotally mounted, as at 56, between the pair of ears 57 of a block 58. The block is welded or otherwise suitably secured to the upper surface of the platform 25, whereby the cylinder 55 may swing slightly in a vertical direction and in parallelism with respect to the longitudinal length of the platform 25.

Within the cylinder 55 a piston head is slidably disposed, said head 59 being represented by dotted lines in Figure 1. A piston rod 60 extends through the upper end of the cylinder 55. The lower end of the rod 60 is rigidly attached to the piston head 59 and the upper end of said rod is pivotally connected, as at 61, between oppositely disposed ears 62 of a block 63, the latter being secured by any suitable means to the under side of an elongated lever beam 64.

The beam 64 is provided with an outer free, vertically movable end 65 which overhangs the body 12 of the device at all times and preferably extends an appreciable distance beyond the rear end of said body 12. The other end 66 of the beam is pivotally attached, as at 67, between the upper ends of a pair of oppositely disposed standards 68.

The standards have lower ends, which may be connected together if desired, and a base portion 69 which is suitably secured to the upper surface of the platform 25.

At 70 an oil pump housing is indicated, having a reservoir therein for a supply of oil. The oil pump within said housing may be of any suitable conventional type and preferably pumps oil from said reservoir by means of rotatable toothed pump wheels disposed within the housing, the latter being driven by means of a shaft 71 which, as best shown in Figure 1, extends outwardly of the housing 70. The shaft 71 is splined to a pulley wheel 72, the latter being driven by a belt 73. The belt 73 is driven by a pulley wheel 74, the latter being rigidly secured to the shaft 37, which comprises an extension of the crank shaft of the engine 35, and as thus described it will be understood that oil under pressure is generated at all times when the engine 35 is operating. If desired, the pulley 74 may be loosely disposed on the shaft 37 and a shiftable clutch provided for coupling it to said shaft, and, similarly, the pulley 38 may be idly mounted on the shaft 37 and a second shiftable clutch provided for coupling it to said shaft so that the engine may operate without driving either one or none of the pulleys 38 and 74 or both of said pulleys simultaneously as may be desired by the operator.

A conduit 75 extends from the housing 70 to the bottom of the cylinder 55 and said conduit is of flexible construction for permitting bending movements thereof responsive to a tilting of the cylinder 55 and during a transmission of oil under pressure from the housing 70 to the interior of the cylinder 55 and against the piston head 59 at times when a conventional valve 76 is in an open position, said valve not being shown.

The valve 76 may be opened by a lever 77, the latter being mounted on the stem of said valve and by the operator manipulating the lever 77 with his foot for permitting oil under pressure to flow into the cylinder 55 for elevating the free end 65 of the beam 64 to a selected position. To maintain said free end elevated, the operator closes the valve 76.

At times when the valve is open and pressure is not applied to the oil by the engine and the oil pump, the weight of the free end of the beam causes it to descend, thereby squeezing the oil from the cylinder 55 and returning said oil to the reservoir in the pump housing through the conduit 75.

A grooved pulley wheel 78 is pivotally mounted between a pair of ears 79, the lower ends of the latter being secured to the upper surface of the platform 25, and a similar wheel 80 is similarly secured to and pivotally mounted at the upper side of the beam 64 above the cylinder 55. A third grooved pulley 81 is pivotally mounted, as at 82, between the bifurcated free outer end 65 of the beam 64.

A flexible cable 83 extends through the beam 64, being reeved over the pulley wheels 78, 80 and 81, as shown in Figure 1. One end of the cable is preferably provided with a ring 84 which the operator attaches to one or more of the hooks 85, the latter being secured to the under side of the beam 64. If desired, a further plurality of spaced apart hooks such as the hooks 85 may be provided for further selectively lengthening and shortening the operative length of the cable 83.

For certain uniform operations the cable 83 may be attached or otherwise secured directly to the free end of the beam 64 and without an employment of the hooks 85.

That end of the cable which is opposite to the ring 84 is provided with a hook or the like 86 for attaching work to it.

As shown in Figure 1, a sling 87 extends around a length of concrete conduit 88 for positioning the latter in a trench 89, as later described.

The combination of parts further preferably includes a pair of oppositely disposed jack screws 90 which may extend through the body 12 of the truck, said body being provided with screw threads which are complemental to the threads of the jacks 90.

The lower ends 91 of the shanks of the jack screws are arranged to engage the springs 13 of the vehicle above the axle housing 11 at times when the handles 92 are rotated for said purpose and for the purpose of relieving compressive weight from said springs for purposes later described.

Among other utilitarian purposes, the new device is particularly well adapted for handling massive concrete conduits, such as the conduit 88; and in this connection it is believed pertinent to mention that since often said conduits are cast or molded on the job or close to their position of use on account of their great weight, they have, heretofore, been troublesome and costly to handle, particularly at times when they are to be abutted end to end together in a trench, as said operation not only necessitates lowering the conduit sections into the trench but also necessitates moving the sections longitudinally for abutting a smaller end of a section within the flanged bell end of a next adjacent section.

In operation, assuming that the conduit section 88 has been cast on the ground adjacent the trench 89 and is disposed at that portion of the surface of the ground indicated at 93, the device of the present invention is caused to be disposed in the position shown in Figure 1. At this time a sling 87 is disposed about the conduit section 88 and attached to the hook 86. The cable 83 then is pulled taut by the operator seated on the platform of the new device. The slack is taken out of the cable 83 by means of attaching the ring 84 thereof to one or more of the hooks 85 for said purpose, whereupon the engine 35 is started and the valve 76 opened by the operator for causing oil under pressure to be applied to the piston head, whereby the free end of the beam 64 becomes elevated, together with the work, article or conduit section 88. When sufficiently elevated the operator closes the valve, thereby causing the free end of the beam and article to remain elevated since the oil within the cylinder cannot escape from the latter at this time. The operator now manipulates the lever 46 for causing the platform, beam and conduit section 88 to be swung horizontally and into position over the trench 89, whereupon the engine 35 may be disconnected from the shaft 41 or the engine stopped. At this time the operator opens the valve 76, whereby the weight of the article 88 and the weight of the free end of the beam causes the oil to flow from the cylinder back to the reservoir and said article to become lowered into the trench 86 correspondingly with respect to the opening and closing of the valve 76.

The springs 13 are preferably provided under the rear end of the body of the vehicle for absorbing shocks and jars during road travelling movements of the device. The springs 13 are comparatively weak, enough so to be flexible, so that they will serve their shock-absorbing purposes, and assuming that a heavy extraneous article, such as the conduit section 88, is to be handled by the device of the present invention, preferably the shanks of the jack screws 90 are caused to be rotated for abutting the lower ends 91 of said shanks against the springs 13, whereby further rotation of said shanks removes the weight of said article from the springs 13, this being of advantage since extremely heavy articles may be handled by the new device without injury to the comparatively weak springs 13.

From the foregoing description it is thought to be obvious that a derrick crane constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice, except as claimed.

I claim:

1. In a crane, a self-propelled vehicle body and compressible springs disposed between said body and axle housing, a platform mounted on said vehicle, means for rotating said platform with respect to said vehicle, a beam having an end pivotally attached to said platform and a free end, a cable attached to said free end having a portion adapted to be attached to an extraneous article, means for removing the weight of said article from said springs, a hydraulically actuated piston mechanism having a rod pivotally attached to said beam between its ends, the cylinder for said mechanism having an end pivotally attached to the platform, and means for rotating said platform and beam in a horizontal direction.

2. In a derrick crane, a vehicle having a body, a circular track having an annular flange secured to said body, a platform pivotally supported on said track, a bracket arm secured to the platform, a beam having an end pivotally secured to the platform and a free end extending beyond said platfrom, a cable reeved over said free end having a portion arranged to be attached to an extraneous article and an opposite end attached to the pivotally secured end of the beam, means for raising said free end and article, and means for revolving said platform with respect to said body, said arm having a portion engaged with said flange for maintaining said platform substantially parallel with respect to said track at times when the weight of said article is carried by the free end of said beam.

3. In a derrick crane, a vehicle having a body, a circular track secured to said body, a platform above said body having a second circular track secured to said platform, a plurality of rollers between said tracks for supporting said platform thereon, said rollers each having a flange disposed outwardly from its inner end surface arranged to engage the inner edges of said circular tracks for preventing sliding movements of said platform with respect to said body during a pivotal turning movement of said platform, a beam having an end pivotally attached to said platform and a free end overhanging said body, means for elevating said free end, and means for rotating said platform and beam with respect to said body.

4. In a derrick crane, a wheeled vehicle having a body and compressible springs disposed between said body and the axle housing of said wheels, a platform pivotally carried by said body, a beam having an end pivotally attached to said platform and a free end disposed beyond said vehicle, a cable disposed over said free end having a portion arranged to be attached to an extraneous article, means for raising the free end of said beam for elevating said article, and means for removing the weight of said article from said springs, the last mentioned means comprising a jack-screw for each spring, said screws being threadedly engaged with said body, the lower ends of the shanks of said jack screws being arranged to engage the medial portions of said springs at times when the shanks of said jack screws are sufficiently rotated.

5. A derrick crane comprising a wheeled vehicle, a horizontally disposed pinion secured stationary to the body of said vehicle, a circular track axially disposed about said pinion and secured to said body, a plurality of rollers disposed on said track, means for maintaining said rollers in an initial spaced apart position, a platform supported on said rollers, means for preventing sliding movements of said platform with respect to said body and permitting pivotal turning movements of the platform in a horizontal direction, an engine carried on said platform, shaft hangers secured to the under side of said platform, a shaft slidably disposed through said hangers, connecting means between said engine and said shaft for rotating the latter, two smaller pinions rigidly secured to said shaft, said smaller pinions being disposed at opposite sides of the stationary pinion, means for selectively causing either one of said smaller pinions to engage said stationary pinion for rotating the platform correspondingly, a beam having an end pivotally attached to said platform and a free end extending beyond said body, a cable reeved over said free end arranged to be attached to an extraneous article for raising and swinging the latter, an oil reservoir carried on said platform, an oil pump arranged to be actuated by said engine, a hydraulically actuated jack mechanism having a lower end pivotally attached to said platform, said jack having a piston rod pivotally connected at its upper end to said beam between the ends of the latter, and valve means for permitting oil under pressure to cause said rod to slide for raising said free end of the beam.

6. In a derrick crane, a vehicle having a body, a circular track secured to said body, a platform above said body having a second circular track secured to said platform, a plurality of rollers between said tracks for supporting said platform thereon, means for preventing sliding movements of said platform with respect to said body during pivotal turning movements of said platform, a beam having an end pivotally attached to said platform and a free end overhanging said body, means for elevating said free end, and means for rotating said platform and beam with respect to said body.

7. A derrick crane comprising a platform; a beam having an end pivotally secured to the platform and a free end extending beyond said platform; a piston rod having an end pivotally attached to said beam between the ends of the beam; the other end of said rod being pivotally supported by said platform; a pulley attached to said platform below said beam; a second pulley attached to the free end of said beam; a cable reeved under the first mentioned pulley and over the other pulley, said cable having an end attached to said beam, the other end of said cable having a portion adapted to be attached to an extraneous article; and means for applying a fluid under pressure to said rod for raising the free end of said beam and article; said pulleys, beam and cable being so constructed and arranged that said article is simultaneously moved toward said free end of the beam during an upward movement of said free end.

8. A derrick crane comprising a vehicle having a body; a rotatable platform above said body; a beam having an end pivotally secured to said platform and a free end; a pulley attached to said platform; a cable having an end attached to said beam, said cable being reeved under said pulley and over the free end of said beam, the other end of said cable having a portion adapted to be attached to an extraneous article; means for elevating said free end; and means for rotating said platform and beam with respect to said body.

FRED A. SHERMAN.